US012626503B2

(12) United States Patent
Van Arnhem et al.

(10) Patent No.: US 12,626,503 B2
(45) Date of Patent: May 12, 2026

(54) FOOD WASTE DETECTION METHOD AND SYSTEM

(71) Applicant: WASTIQ B.V., Utrecht (NL)

(72) Inventors: Bart Van Arnhem, Eindhoven (NL); Olaf Egbert Van Der Veen, Utrecht (NL)

(73) Assignee: WastIQ B.V., Utrecht (NL)

( * ) Notice: Subject to any disclaimer, the term of this patent is extended or adjusted under 35 U.S.C. 154(b) by 758 days.

(21) Appl. No.: 17/413,639

(22) PCT Filed: Dec. 13, 2019

(86) PCT No.: PCT/EP2019/085143
§ 371 (c)(1),
(2) Date: Jun. 14, 2021

(87) PCT Pub. No.: WO2020/120757
PCT Pub. Date: Jun. 18, 2020

(65) Prior Publication Data
US 2022/0058388 A1 Feb. 24, 2022

(30) Foreign Application Priority Data

Dec. 14, 2018 (NL) ..................................... 2022213

(51) Int. Cl.
*G06V 20/00* (2022.01)
*B65F 1/14* (2006.01)
(Continued)

(52) U.S. Cl.
CPC ................ *G06V 20/00* (2022.01); *B65F 1/14* (2013.01); *G01B 11/22* (2013.01); *G01B 17/00* (2013.01);
(Continued)

(58) Field of Classification Search
CPC ........... G06V 20/00; G06T 7/62; G06F 18/41; H04N 13/204; H04N 7/188; G01B 11/22;
(Continued)

(56) References Cited

U.S. PATENT DOCUMENTS

2003/0018897 A1* 1/2003 Bellis, Jr. ......... G06Q 20/40145
713/182
2012/0032571 A1* 2/2012 Schoen ................... G01G 21/30
312/223.1
(Continued)

FOREIGN PATENT DOCUMENTS

CA 3090611 A1 8/2019
CN 206222781 U 6/2017
(Continued)

OTHER PUBLICATIONS

Anonymous: "Starthubs", Oct. 22, 2018, pp. 1-4, retrieved from the Internet: URL:https://starthubs.co/nieuws/74.
(Continued)

*Primary Examiner* — Rowina J Cattungal
(74) *Attorney, Agent, or Firm* — Benjamin D. van der Sman; Hoyng Rokh Monegier B.V.

(57) ABSTRACT

A system (1) for detecting food related products (2) before thrown away, the system comprising: one or more cameras (11); a display unit (12); a computing device (13) that is communicatively connected to the cameras and the display; and a scale (3) that is communicatively connected to the computing device, the scale holding a trash bin (31), wherein the cameras obtain an image or a video of the products when the products are within a field of view of the cameras and before the products are in the trash bin, the scale configured to weigh the products in the trash bin, and wherein the computing device obtains information about the products from the obtained image or video by applying an image recognition algorithm, receives the weight from the (Continued)

Direct Intermediate
Image Feedback

Re-inforcement Learning
Feedback Provided by User

Smart
Camera

Camera Takes
Automatic Picture of
Container / Plate in
View of Camera

Computer Vision
(Cloud or Local
Device)

Detection
Results

Final
Registration
Feedback

Touchscreen
Terminal

Match Image,
Detection Results
and Weight

Cloud
Storage

Dashboard
Actionable Insights

Smart
Scale

Scale Detects Weight
Change of Waste
Thrown in Bin

Direct Intermediate
Weight Feedback scale and generates and outputs data on the display unit, the data being based on the information about products and the weight.

17 Claims, 5 Drawing Sheets

(51) Int. Cl.

| | |
|---|---|
| *G01B 11/22* | (2006.01) |
| *G01B 17/00* | (2006.01) |
| *G01G 19/52* | (2006.01) |
| *G06F 18/40* | (2023.01) |
| *G06Q 10/30* | (2023.01) |
| *G06T 7/62* | (2017.01) |
| *G06V 20/68* | (2022.01) |
| *G08B 7/06* | (2006.01) |
| *H04N 7/18* | (2006.01) |
| *H04N 13/204* | (2018.01) |
| *H04N 13/00* | (2018.01) |

(52) U.S. Cl.
CPC ............. *G01G 19/52* (2013.01); *G06F 18/41* (2023.01); *G06Q 10/30* (2013.01); *G06T 7/62* (2017.01); *G08B 7/06* (2013.01); *H04N 7/188* (2013.01); *H04N 13/204* (2018.05); *B65F 2210/138* (2013.01); *B65F 2210/168* (2013.01); *B65F 2210/184* (2013.01); *G06T 2207/10012* (2013.01); *G06V 20/68* (2022.01); *H04N 2013/0074* (2013.01)

(58) Field of Classification Search
CPC ........ G01B 17/00; G01G 19/52; G06Q 10/30; G08B 7/06
See application file for complete search history.

(56) References Cited

U.S. PATENT DOCUMENTS

| | | | |
|---|---|---|---|
| 2016/0078414 A1 | 3/2016 | Rathore et al. | |
| 2017/0024044 A1* | 1/2017 | Li | G06F 3/0425 |
| 2017/0046801 A1* | 2/2017 | Byron | G06N 20/00 |
| 2017/0069222 A1 | 3/2017 | Mekhsian et al. | |
| 2017/0213184 A1* | 7/2017 | Lee | G06K 7/1443 |
| 2017/0243279 A1 | 8/2017 | Thompson et al. | |
| 2019/0019167 A1* | 1/2019 | Candel | B65F 3/14 |
| 2019/0147614 A1* | 5/2019 | Hamzic | G07G 1/0063 |
| | | | 382/154 |
| 2019/0197278 A1* | 6/2019 | Kastury | G06K 19/06103 |
| 2020/0222949 A1* | 7/2020 | Murad | B07C 7/02 |
| 2021/0397648 A1* | 12/2021 | Zornes | G06Q 10/30 |

FOREIGN PATENT DOCUMENTS

| | | | | |
|---|---|---|---|---|
| CN | 107640480 A | | 1/2018 | |
| CN | 108072914 A | * | 5/2018 | G01V 9/00 |
| CN | 108073906 A | | 5/2018 | |
| CN | 108364675 A | | 8/2018 | |
| CN | 108597582 A | | 9/2018 | |
| CN | 208022172 U | * | 10/2018 | |
| GB | 2573363 A | | 11/2019 | |
| JP | 2004139278 A | | 5/2004 | |
| JP | 2005293395 A | | 10/2005 | |
| JP | 2012093962 A | | 5/2012 | |
| JP | 2017520753 A | | 7/2017 | |
| JP | 2018147415 A | | 9/2018 | |
| JP | 2021513708 A | | 5/2021 | |

OTHER PUBLICATIONS

Anonymous: "zer0foodwaste", Dec. 5, 2018, pp. 1-3, retrieved from the Internet: URL:https://www.pikbee.biz/media/BrAJy2b1D8q.
Anonymous: "The Future Kitchen", Apr. 11, 2019, pp. 1-20, retrieved from the Internet: URL:https://www.ahic.com/sessions/2019/WINNOW-x-EMAAR.pdf.

* cited by examiner

FOOD WASTE DETECTION METHOD AND SYSTEM

CROSS REFERENCE TO RELATED APPLICATIONS

This application claims priority from Dutch application number 2022213 filed on 14 Dec. 2018, the contents of which are hereby incorporated by reference in their entirety. This application is a national stage entry of international application no. PCT/EP2019/085143 which was published under PCT Article 21(2) in English, the contents of which are hereby incorporated by reference in their entirety.

TECHNICAL FIELD

The present invention relates to a system and a method for detecting food related products, and to a display unit for use in the system.

BACKGROUND ART

Venues that work with food are often faced with food waste by having to throw away food that passed expiration date or is left over after consumption or preparation. An example of such venue is a restaurant, where food waste may be generated by customers leaving food on their plates, in the kitchen by having leftovers after preparing diners, or in the inventory by having food passing the expiry date.

There is a need to reduce food waste. Insight in the food waste may be used by a restaurant for example to optimize planning, proportioning and inventory management, resulting in a more efficient purchase of food and acting in a more environmentally friendly manner. Other examples of venues that may benefit from insight in food waste are caterers, catering industry, hospitals, healthcare institutions, and generally any venue involved in food preparation.

SUMMARY

According to an aspect of the invention, a system is proposed for detecting food related products before being thrown away. The system can comprise one or more cameras. The system can further comprise a display unit. The system can further comprise a computing device that is communicatively connected to the one or more cameras and the display unit. The system can further comprise a scale that is communicatively connected to the computing device. The scale can be configured to hold a trash bin. The scale can be separable from the trash bin, e.g. by simply placing any trash bin on the scale. The scale can be integrated in the trash bin. The trash bin may be a recycle bin. The one or more cameras can be configured to obtain an image or a video of the food related products when the food related products are within a field of view of the one or more cameras and before the food related products are in the trash bin. Advantageously, this enables food left-overs to be detected before being inter-mixed with other food waste in the trash bin. The scale can be configured to obtain weight information of the food related products when the food related products are in the trash bin. The computing device can be configured to obtain information about the food related products from the obtained image or video by applying an image recognition algorithm. This image recognition algorithm can run locally on the computing device or remote on a remote server to which the computing device may be communicatively connected. The computing device can be configured to receive the weight information from the scale. The computing device can be configured to generate and output data on the display unit, wherein the data is based on the information about the food related products and the weight information.

The food related products are typically food leftovers but can also include other objects that are to be thrown away such as plastics, paper, napkins, cardboard and (disposable) cutlery. The food related products may include a bin, plate or other tray item on which the disposables are placed, which may be detected together with the disposables and input to the image recognition algorithm to improve the detection of the food left-overs or other disposables.

In an embodiment the computing device can be communicatively connected to a remote server. The computing device can be configured to transmit the obtained image or video to the remote server for applying the image recognition algorithm. The computing device can be configured to receive the information about the food related products from the remote server. The remote server can be implemented as a cloud computing server or cloud computing service.

In an embodiment the computing device can be further configured to store one or more of the information about the food related products, the weight information, the output data, and at time stamp in a data storage of the remote server. This enables food waste to be analyzed or mapped over time. This also enables recommendations to be generated regarding minimizing the food waste as detected over time.

In an embodiment the computing device can be configured to present one of more questions on the display unit about one or more objects in the obtained image or video in case the image recognition algorithm is unable to identify one or more of the food related products from the image or the video. The display unit can comprise a user interface, preferably in the form of a touch screen interface, for receiving user input in response to the one or more questions. The response can be used by the image recognition algorithm to improve detection of the one or more objects.

In an embodiment the one or more cameras can be configured to automatically obtain the image or the video when the food related products are within the field of view of the one or more cameras or depth sensors, at a substantially fixed position for a dynamic minimal amount of time necessary for successful detection. The user can be provided audiovisual feedback upon successful ingredient detection. The fixed position can be any position within the field of view and is typically defined by the location at which a user holds the food related products under the one or more cameras before throwing it into the trash bin.

In an embodiment the output data can comprise a ratio of different food related products. The different food related products can be detected by the image recognition algorithm. The ratio can be based on the weight information. Thus, by combining the weight information and the image detection algorithm, the ratio of the different food related products as presented to the camera and the scale can be obtained.

In an embodiment the one or more cameras can comprise a stereoscopic imaging camera for obtaining 3D information about the food related products from the image or the video.

In an embodiment the image recognition algorithm can be configured to obtain volumetric information from the 3D information. The computing device can be configured to obtain a weight estimation of the food related products based on the volumetric information. The stereoscopic camera can replace the scale. The weight estimation can be used instead of the weight information. Thus, the system can be realized without a scale when using a stereoscopic camera.

In an embodiment the one or more cameras can comprise a hyperspectral imaging camera for obtaining substance information about the food related products from the image or the video. Non-limiting examples of substance information are levels of fat, protein and sugar in food left-overs.

In an embodiment the system can further comprise a depth sensor, for example an ultrasonic depth sensor or laser-based depth sensor, for detecting when the food related products are within the field of view of the one or more cameras. The depth sensor may be used in conjunction with the one or more cameras or stand alone to detect when the food related products are within a field of view of the one or more cameras to thereby trigger the one or more cameras to obtain the image or a video of the food related products. The depth sensor is typically located next to the one or more cameras.

In an embodiment the field of view can be located in an area around a line of sight from the one or more cameras in a substantially downwards direction.

In an embodiment the display unit can comprises a housing for accommodating the one or more cameras. The housing can comprise an outer surface side that is placed at an angle from a horizontal plane. The cameras can be located within the housing at the outer surface side resulting in the line of sight being vertically angled at the angle. The line of sight is perpendicular to the outer surface side. The angle can be in a range of 15 to 45 degrees, preferably in a range of 15 to 30 degrees, more preferably in a range of 15 to 25 degrees.

In an embodiment the housing of the display unit can further comprise the computing device.

In an embodiment the housing can further comprises a visual indicator indicating where the food related products are to be presented to the one or more cameras.

In an embodiment the visual indicator can change its color when the food related products have been registered by the one or more cameras.

In an embodiment the housing can further comprises an audible indicator providing audible feedback.

In and embodiment the audible indicator can produce a sound when the food related products have been registered by the one or more cameras.

In an embodiment the scale can comprises at least one sloped side wall allowing the trash bin to be rolled on and off the scale.

According to an aspect of the invention, a display unit in a housing is proposed, the housing further comprising one or more cameras and a computing device, for use in a system having one or more of the above described features.

According to an aspect of the invention, a method is proposed for detecting food related products before being thrown away. The method can comprise obtaining an image or a video of the food related products using one or more cameras when the food related products are within a field of view of the one or more cameras and before the food related products are thrown in a trash bin. The method can further comprise obtaining weight information of the food related products using a scale when the food related products are in the trash bin, wherein the scale is configured to hold the trash bin. The method can further comprise obtaining information in a computing device about the food related products from the obtained image or video by applying an image recognition algorithm. The method can further comprise generating and outputting data by the computing device on the display unit, wherein the data can be based on the information about the food related products and the weight information.

In an embodiment the method can further comprise transmitting the obtained image or video from the computing device to the remote server for applying the image recognition algorithm. The method can further comprise receiving the information about the food related products from the remote server in the computing device.

In an embodiment the method can further comprise presenting one of more questions on the display unit about one or more objects in the obtained image or video in case the image recognition algorithm is unable to identify one or more of the food related products from the image or the video. The method can further comprise receiving user input from a user interface of the display unit in response to the one or more questions, the response for use by the image recognition algorithm to improve detection of the one or more objects.

Hereinafter, embodiments will be described in further detail. It should be appreciated, however, that these embodiments may not be construed as limiting the scope of protection for the present disclosure.

BRIEF DESCRIPTION OF DRAWINGS

Embodiments will now be described, by way of example only, with reference to the accompanying schematic drawings in which corresponding reference symbols indicate corresponding parts, and in which.

The figures are meant for illustrative purposes only, and do not serve as restriction of the scope or the protection as laid down by the claims.

DESCRIPTION OF EMBODIMENTS

Figure 1:
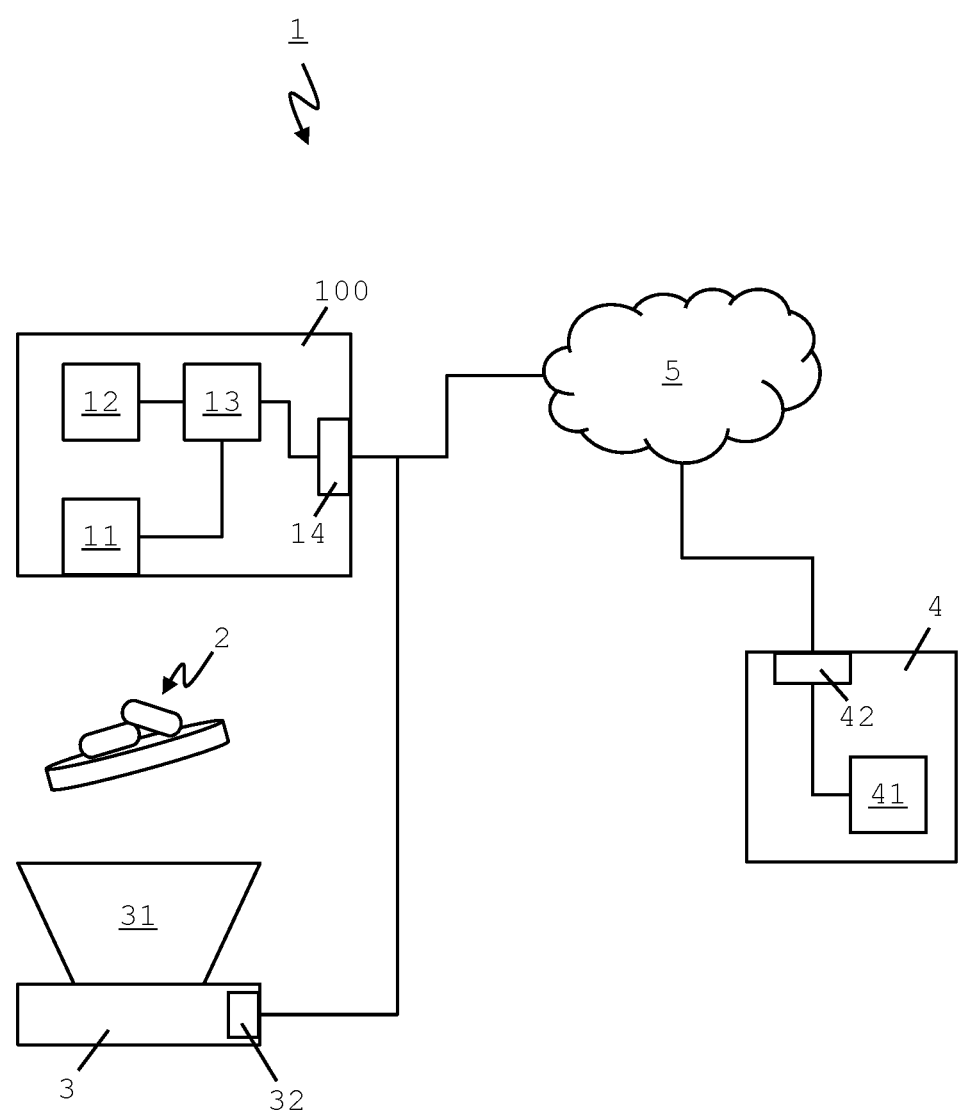
FIG. 1 shows a system of an exemplary embodiment of the invention.

FIG. 1 shows an exemplary system 1 for detecting food related products 2 before being thrown away in a trash bin 31. The system 1 preferably includes a housing 100 that includes one or more cameras 11, a display unit 12, a computing unit 13 and a communications module 14. Although less preferred, it is possible to have the one or more cameras 11 separated from the housing 100 and/or have the computing device 13 separated from the housing 100. The system 1 may include a scale 3 that is configured for holding a trash bin 31 and weighing the food related products 2 when placed in the trash bin 31. The scale 3 may be integrated within the trash bin 31. Preferably, the trash bin 31 is a recycle bin allowing the food related products 2 to be recycled after being thrown away. The scale 3 may include a communications module 32 for communicating with the computing device 13, typically via the communications module 14.

The display unit 12 is typically capable of presenting full color bitmap images representative of food detected amongst the food related products 2. The display unit 12 may be configured to display a graphical user interface, for example in the form of selectable button objects or any other user interface elements selectable through a touch screen interface of the display unit 12. The computing device 13 may be any suitable CPU, GPU and/or NPU based computer, for example in the form of a Raspberry Pi™ computer. Preferably the computing device 13 is a small form factor or single board computer to minimize the size requirements of the computing device 13. The communications module 14 may be integrated with the computing device 13. The communications module 14 may be any suitable wireless or wired communications module. The communications module 14 may include multiple different communication interfaces, for example a Bluetooth™ interface for short range communication with the communications module 32 of the scale 3 and a Wi-Fi or LAN interface for communication with a remote server 4. In the example of a Wi-Fi or LAN interface, the communication typically further involves a router (not shown) for connecting to the Internet 5, a local area network or any other suitable network.

In an exemplary embodiment the housing 100 and the scale 3 may be connected by a pole or other vertically aligned support structure for fixing the housing 100 at a vertical distance from the scale 3. This allows the housing 100 and the scale 3 to be moved around or placed at a desired location as a single unit. The vertically aligned support structure may be used to guide or accommodate electrical cabling and/or data cables for electrical or data/signal connections between the scale 3 and components in the housing 100.

The remote server 4 typically includes a data storage 41 and a communications module 42. The remote server 4 may be a stand-alone server, implemented as cloud computing server, implemented as a cloud computing service, or any other computer system. The data network 5 may be a local area network, a wide area network, the Internet, or any other suitable network.

Figure 2:
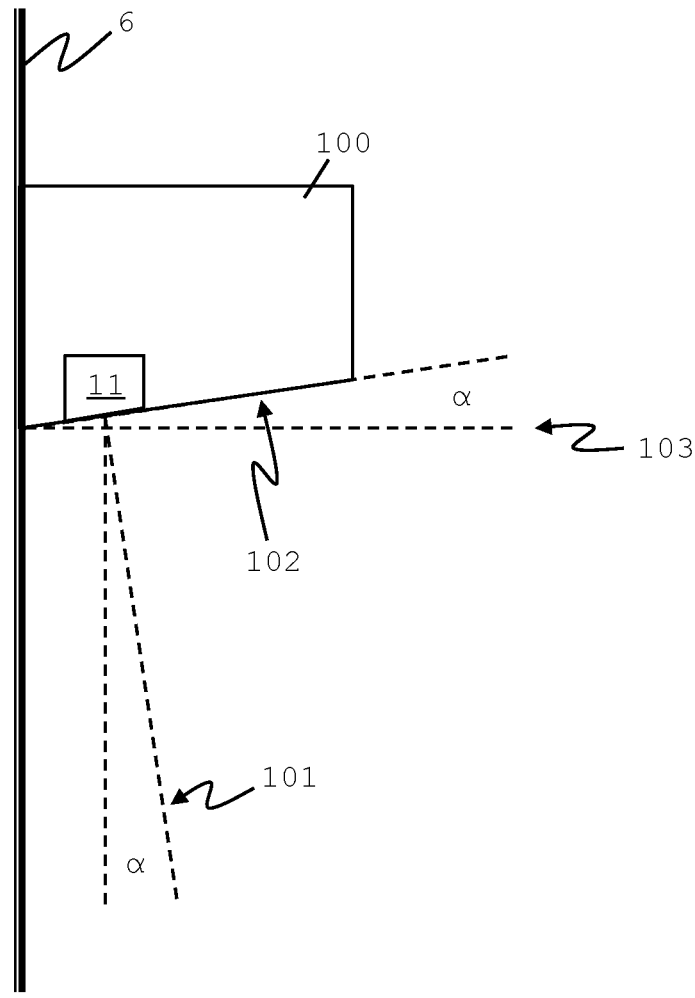
FIG. 2 shows a schematic side view of a housing and camera of an exemplary embodiment of the invention.

FIG. 2 shows an exemplary embodiment of a camera setup in a housing 100. In FIG. 2 a side view of the housing 100 including a camera 11 is shown. The housing 100 may be attached to a wall 6. In FIG. 2 the housing 100 has an outer surface side 102 at the underside of the housing 100. The outer surface side 102 may be placed under an angle α from a horizontal plane 103, thus the underside of the housing 100 may be placed under angle α. The camera 11 may be installed in the surface side 102. As the line of sight 101 from the camera is typically in a direction perpendicular to the surface side 102, the line of sight 101 may thus be vertically angled under the angle α. Particularly when the housing 100 is attached to the wall 6, the angled line of sight 101 may improve the field of view by eliminating covering a large part of the wall 6 where no food related products 2 can be presented under the camera 11. Furthermore, the angled line of sight 101 enables a slight view of the products from the side, thereby improving the detectability of the food related products 2.

Figure 3:
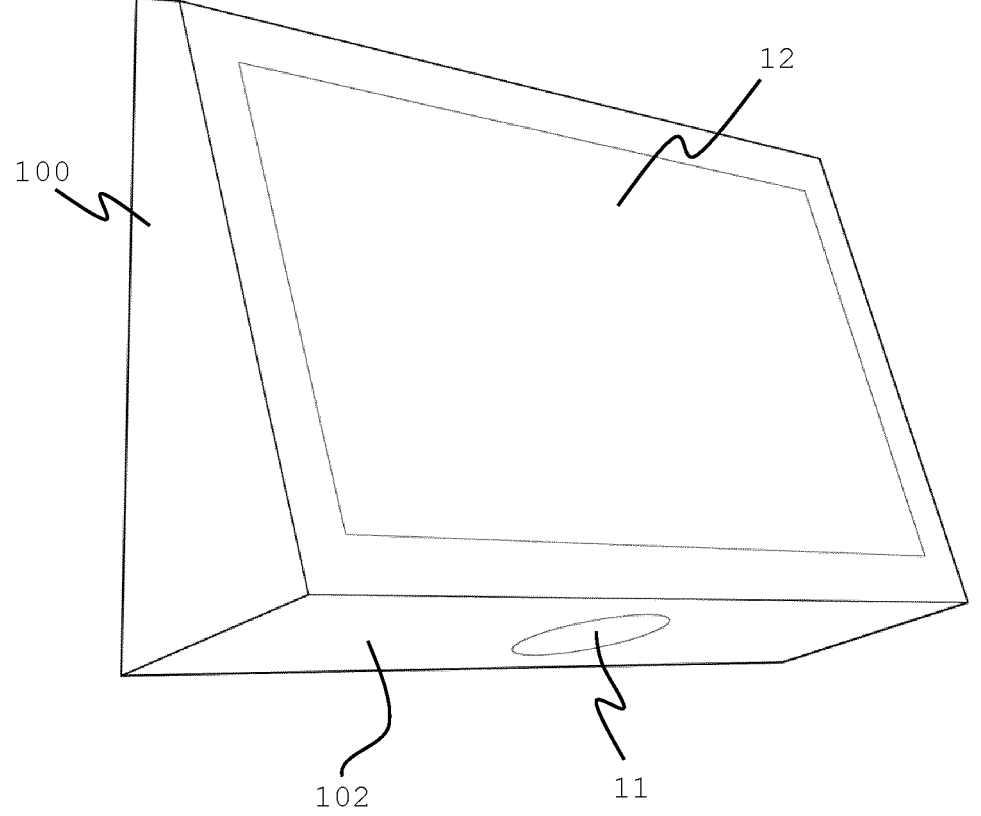
FIG. 3 shows an elevated side view of a display unit and camera in a housing of an exemplary embodiment of the invention.

FIG. 3 shows an exemplary display unit 12 that may be installed in a housing 100. FIG. 3 further shows a camera 11 that may be installed in the housing 100. In the example of FIG. 3 the underside of the housing where the camera 11 is installed, is placed under an angle to allow the line of sight of camera 11 to be vertically angled, as explained with FIG. 2.

In an embodiment, food related products—preferably everything—that end up in the trash bin 31 may be first captured by a smart camera 11 above the trash bin 31 and then captured by a digital scale 3 located underneath the bin

31. When something is moved within the field of view of the camera, the camera may automatically take a picture or shoot a video as soon as it detects that an object is fully within view and is kept stable (stopped moving) at a fixed location within the field of view. The object may include a plate or a container onto which the food related products 2 are located. The object may be a human hand holding the food related products 2. The user can be provided audiovisual feedback upon successful ingredient detection. The captured image may be sent to the cloud 4, where an ingredient detection may be performed by an image recognition algorithm. Alternatively, the image recognition algorithm may be performed locally, for example in the computing device 13. The model used by the image recognition algorithm may detect/recognized one or more of the food related products 2 on the image and may send the results back to computing device 13 for local feedback on the display unit 12. When the waste 2 is thrown into the bin 31, the digital scale 3 may capture the weight and send this information to the computing device 13 and/or the cloud 4. The weight and image processing result may be linked to each other in the ratio at which the ingredients were recognized and the thus obtained results may be sent back to the computing device where the results may be displayed on the display unit 12. The results may also be stored in a data storage 41, such as a cloud database. Preferably, the results are stored together with a time stamp or any other indication of a date and/or time. This data may then be used at any point in time to generate dashboards that show the actionable results.

The possible items that are captured in the eye of view of the camera are limited and therefore relatively easy to detect by waste stream. We currently focus on food waste and have identified four different types of food waste streams in a restaurant. However, in practice we see that not all restaurants split their waste, resulting in that the tool also detects other types of waste, for example: plastics, paper, cardboard, cutlery. This gives our detection model an opportunity that goes beyond solely food waste.

Different types of food waste streams may be captured by the system 1. Examples hereof are: (i) expired products from an inventory; (ii) processed kitchen waste, which may be detectably presented to the camera 11 on metal containers, in bins or pans or big plastic containers; (iii) cutting waste, which may be detectably presented to the camera 11 on cutting plates or bigger plastic or metal bins; and (iv) waste in a restaurant, which may be detectably presented to the camera 11 on smaller plates or bowls (e.g. porcelain).

The state or condition of the food related products 2 may be detected in the image as well and may be used in the analysis of the waste stream. For example, in a restaurant environment, the following detection criteria may be used: (i) for expired products from an inventory, product may be untouched and therefore more easy to detect; (ii) processed food from a kitchen may be finely chopped, mashed or may include liquid side dishes; (iii) cutting waste from the kitchen may include inedible peals and bones; and (iv) plate waste from the restaurant may include left-overs from plate or parts of products that may be more difficult to detect because it is partly eaten and mixed. The system 1 may be capable of detecting the state of condition to further improve the detection of the food related products 2 and/or to generate recommendations about minimizing food waste.

In an exemplary embodiment the camera 11 may be placed approximately 50 cm above the bin 31 or another base platform. In another exemplary embodiment the camera 11 may be placed approximately 70 cm above the bin 31 or another base platform. Registration of the food related products 2 may take place between this platform and the camera 11, for example at 40 cm under the camera 11, which may be detected by a depth sensor. The depth sensor may thus be used to trigger the camera 11 to start the registration of the food related products 2. As shown in FIG. 3, the camera 11 may be placed at a slight angle α to the surface 102 on which the camera 11 may be mounted. For example, with reference to FIG. 2, the angle α may be any angle between 15 degrees to 45 degrees from a horizontal plane 103 to enable the camera 11 to have a better perspective, both in taking an image that is unobstructed by the plane upon which the machine is mounted and to get a slight view of the products from the side.

In an embodiment, the camera 11 may be completely detached from the display unit 12 so as to make the system more suited when space is a limitation. This may also enable the camera 11 to be placed so as to provide an optimal perspective of the food waste that will be registered.

For the detection of ingredients in the food related products 2, classification of dishes and waste stream origin (e.g. kitchen, restaurant) computer vision technology may be used. At the core of such computer vision technology are neural networks and deep learning. This is a so called semi-supervised machine learning approach. The terminology "supervised" means that the image recognition algorithm is typically trained to incrementally become better at the tasks it should perform (the detection). The training is typically done by giving the computer a lot of examples in which a human—through a user interface such as a graphical user interface—has manually labeled the ingredients, the type of dish and type of waste stream.

There are different types of image recognition strategies that may be applied. Most used strategies are: (i) classification to classify and assign a label to an image as a whole; (ii) detection to detect and label possibly multiple objects within an image; and/or (iii) segmentation, which is a fine-grained approach where each individual pixel of an image may be assigned a label.

For a dish and waste stream classification, the first two types of image recognition strategies are most suitable, i.e. classification and detection. For ingredient detection, the third strategy is most suitable, i.e. the more powerful segmentation strategy. With the segmentation strategy, a per-pixel labeling may be used to compute the ratio as to which ingredients occur within the image. The ratio may be used to improve the weight estimate that may be assigned to each individual ingredient. The input images that may be used to train the ingredient detection may require a lot of detail, meaning that for each pixel or a group of pixels the name of the ingredient may be assigned.

Once trained, the model may be used to independently recognize ingredients in new images as captured by the camera 11 that are fed into the image recognition algorithm. Hence the term "semi"-supervised is applicable: as soon as the model is trained, it may be used to automatically recognize ingredients in images without any required manual actions.

Additional domain knowledge may be used—such as the physical position of the camera 11, housing 100 and/or scale 3 within a venue such as a restaurant, and/or the menu of the restaurant in question—to improve accuracy by limiting the scope in which the detection algorithm has to operate. For example, the physical position may be used to determine that only certain waste streams will be recorded by the particular system 1, and the menu may be used to limit the variety in ingredients the system 1 may encounter.

To improve quality and accuracy of the detection algorithms, the one or more cameras 11 may include a stereoscopic camera. A stereoscopic camera is capable of obtaining a 3D depth image that may provide more information on the volume of food that is thrown away and help improve the weight estimate. Compared to a single top-down camera, which may have a problem of occlusion where certain ingredients may be invisible to the camera when covered by other materials, the stereoscopic camera may use two slightly differently angled cameras to provide a better view. Computer vision techniques such as Siamese Neural Networks can use stereoscopic images as input and may be used to better detect the food related products 2 when presented to a stereoscopic camera.

A stereoscopic camera may be used to obtain volumetric information of the food related products 2. Together with the identification of the food itself, the volumetric information may provide an indication of the weight of the detected food. The stereoscopic camera may then be used instead of the scale 3, in which case the system 1 does not need to include the scale 3.

To improve quality and accuracy of the detection algorithms, the one or more cameras 11 may include a hyperspectral camera. A hyperspectral camera is capable of obtaining a spectrum per pixel resulting in a lot more information than a standard RGB camera. This information may be used to detect, for example, levels of fat, protein and sugar, and may simplify and improve quality of detection of ingredients.

The weight of what ends up in the bin 31 may be registered to the respective food waste picture, possibly to the ratio in which the ingredients are detected in the image. This process may be performed in a short time frame, e.g. within seconds, after the picture is taken and the image and weight data may be sent combinedly to the remote server 4.

In case the image recognition algorithm cannot determine/detect the food related products 2 from the image, the image may be sent to the remote server 4 or to another remote server or cloud for redetection within the most up-to-date detection model, which may result in a multiple-choice option of images being sent to the display device 12 as a feedback screen. The end user may then select one or multiple images in the feedback screen to identify the product(s). If (parts of) the image is not in the multiple choice, the user may be offered to provide further feedback, for example in the form of a selectable "explain" button to write down what product(s) was not detected. This feedback from the user may be directly added to the detection model of the image recognition algorithm.

Feedback from the end user may be provided in various manners. For example, the display device 12 may include a touch screen interface for providing the feedback. Alternatively or additionally, a speech recognition interface may be installed in the housing 100 allowing the end user to interact with the system. Alternatively or additionally, one or more buttons on the housing 100 may enable the end user to provide feedback to the system.

The system 1 may be used in various use cases. Non-limiting examples of use cases are: (i) disposal during cleanup by staff in a kitchen or restaurant; (ii) discard during cleanup by a guest in a kitchen or restaurant; (iii) assembly line detection where the food related products 2 will be presented to the one or more cameras 11 without human involvement, for example in self-service restaurants; (iv) detection of food related products in tray carts where multiple trays are collected before throwing away leftovers and trash and cleaning the trays and cutlery in self-service restaurants and health care institutions.

Typically, the scale 3 and trash bin 31 will be located underneath the camera 11, but it is possible to place the scale 3 and trash bin 31 at another location. Preferably, the scale 3 and trash bin 31 are located in a vicinity of the camera 11 to ease the handling of the waste from holding underneath the camera to throwing away the waste in the bin.

The system 1 may be used to stimulate waste reduction by providing performance data, possibly anonymously, between neighboring and/or peer restaurants for comparison.

The system may alternatively or additionally detect other types of waste, besides food related products 2. Examples hereof are plastics, paper, cardboard and cutlery.

The system 1 may be integrated with 3rd party vendors providing for example stock management solutions or point of sale solutions.

Figure 4:
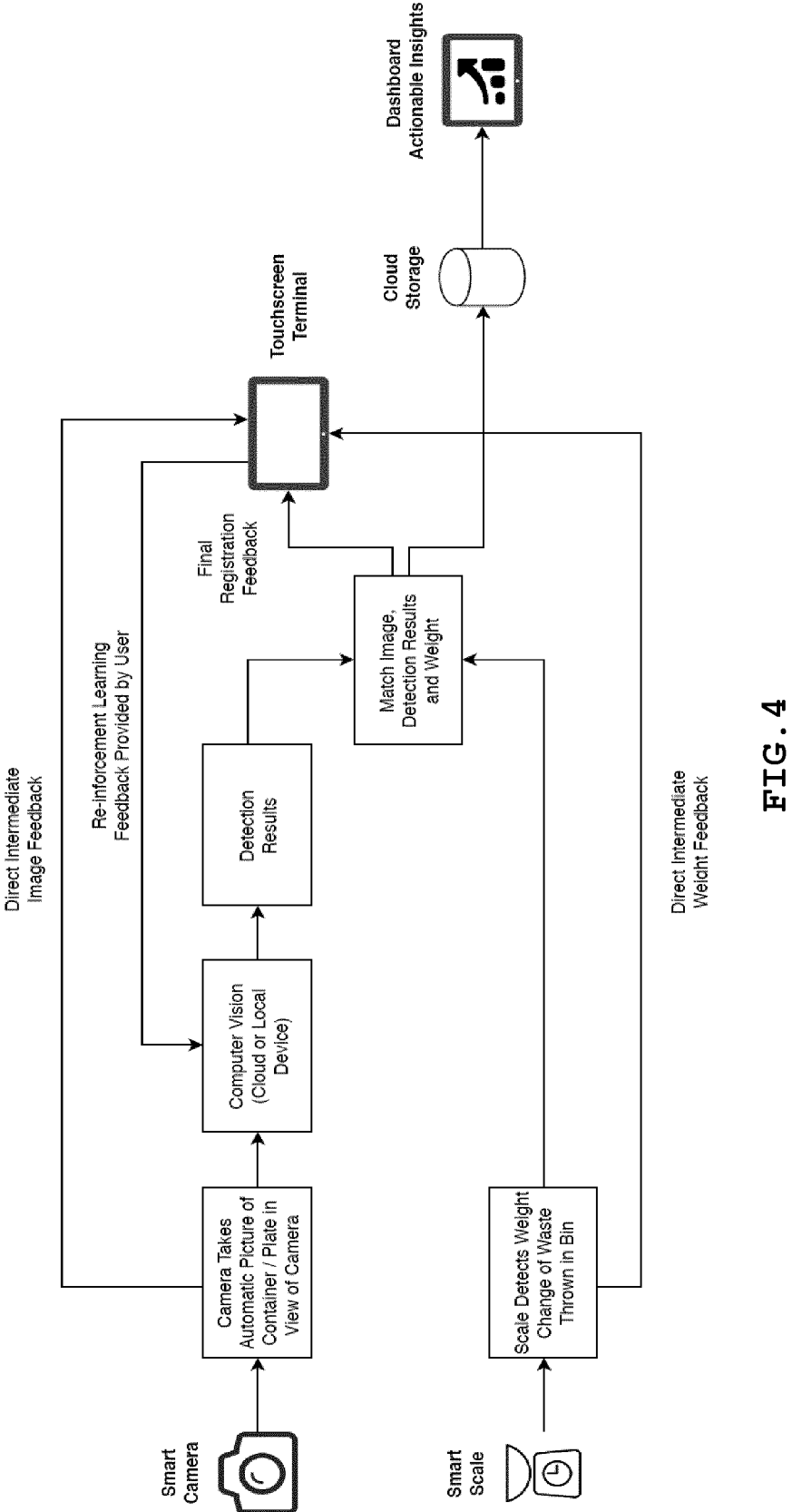
FIG. 4 shows a block diagram of steps of a method of an exemplary embodiment of the invention.

FIG. 4 shows an exemplary block diagram of steps that may be performed by parts of a system 1 as shown in FIG. 1. Comparing FIG. 4 with FIG. 1, the smart camera may be similar to the one or more cameras 11, the smart scale may be similar to the scale 3, the touchscreen terminal may be similar to the display unit 12, the cloud storage may be similar to the data storage 41. Starting from the smart camera, in FIG. 4 the camera may automatically take a picture of a container or plate that is in view of the camera or depth sensor. Direct intermediate image feedback may be transmitted to the touch screen terminal, where the obtained image may be presented as a full color bitmap image. The picture that has been taken may be input to a computer vision program, which may be running on a local computer device 13 and/or in a remote server 4 such as a cloud. The computer vision program may apply the image recognition algorithm to the image to obtain detection results. After the picture has been taken, the waste may be thrown in the bin. Starting from the smart scale, the scale may then detect a waste change of waste thrown in the bin. The waste change may be indicative of the weight of the last waste thrown in the bin. Direct intermediate weight feedback may be transmitted to the touch screen terminal, where the obtained weight information may be presented. The detection results and the weight information may be matched and a final registration feedback indicative of the waste that has been thrown away may be presented on the touch screen terminal. The detection results and weight information may additionally or alternatively be stored in the cloud storage, from where statistical information may be generated and actionable insights may be presented for example on a dashboard output on a website or in a dashboard application. The touchscreen terminal may be used to obtain re-enforcement learning feedback provided by the user, which may be fed into the computer vision program to improve the detectability of the waste.

Figure 5:
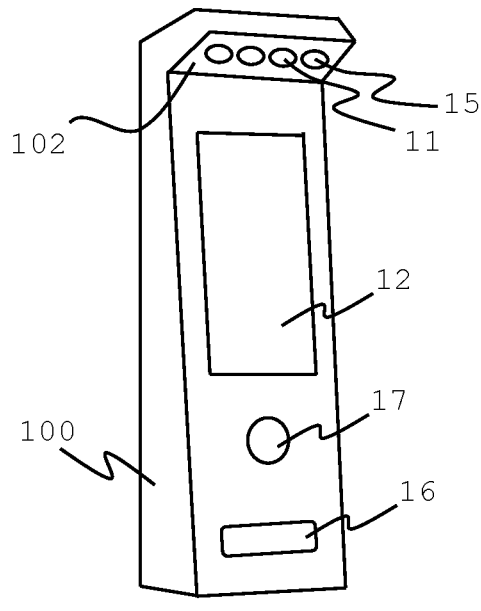
FIG. 5 shows another exemplary embodiment of a display unit in a housing.

FIG. 5 shows an exemplary display unit 12 in a housing 100, which is a non-limiting alternative to the display unit and housing shown in FIG. 3. In this example the camera 11 may be located at a higher location than the display 12. The housing 12 may further include one or more light sources 15 for illuminating the food related products 2 enabling better detection by the camera 11, The other two circles shown at the top of the housing indicate the possibility of having further sensors, cameras and/or further light sources. These further sensors, cameras and/or light sources may be different in functionality from the camera 11 and light source 15, e.g. a depth sensor or infrared light source.

The housing 100 may include a visual indicator 16 indicating the height at which the food related products are to be presented to the camera before throwing in the trash bin 31. This helps the system in letting the user place the products at an optimal position with respect to the camera to detect what will be thrown in the bin. The visual indicator 16 may be implemented in various manners, for example as an illuminated LED strip. When using a light emitting visual indicator, the color of the light may be changed to indicate a status. For example, the color of the visual indicator 16 may turn green when the products have been registered by the camera thus indicating that the products may be thrown into the bin.

The housing 100 may include an audible indicator 17 for providing feedback to the user, e.g. to indicate that the products have been registered by the camera thus indicating that the products may be thrown into the bin.

Figure 6A:
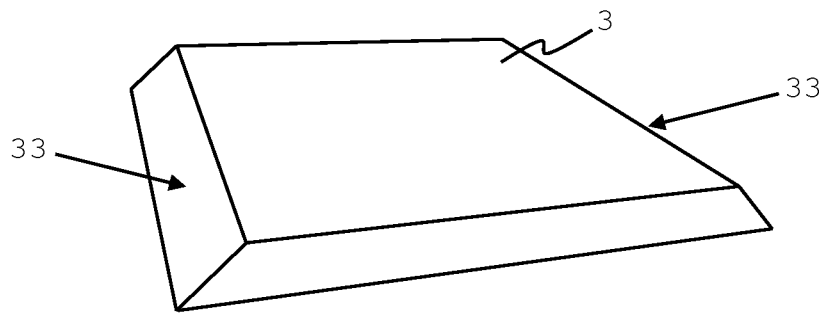
FIG. 6A shows an elevated side view of an exemplary scale.
Figure 6B:
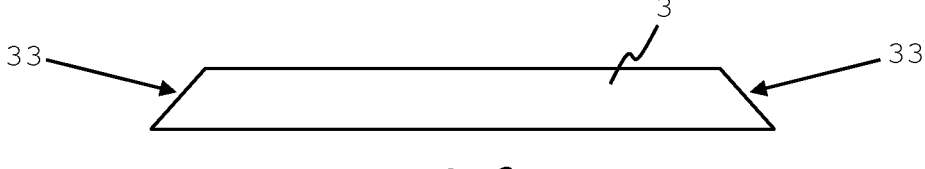
FIG. 6B shows a side view of an exemplary scale.

FIGS. 6A and 6B and show an exemplary scale 3, which may be used in the system of FIG. 1. The weighing scale 3 of FIGS. 6A and 6B is designed to be as low as physically possible to allow more space for the bin 31 and more space between the bin 31 and the camera 11. Moreover, the scale 3 of FIGS. 6A and 6B includes at least one—e.g. two—ramps 33, i.e. sloped side walls, to allow a trash bin to be rolling on and off the scale 3. The ramps 33 may form a single piece of material with the top part of the scale, i.e. be part of the moving part of the scale 3 when measuring weight.

One or more embodiments may be implemented as a computer program product for use with a computer system. The program(s) of the program product may define functions of the embodiments (including the methods described herein) and can be contained on a variety of computer-readable storage media. The computer-readable storage media may be non-transitory storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information may be permanently stored; and (ii) writable storage media, e.g., hard disk drive or any type of solid-state random-access semiconductor memory, flash memory, on which alterable information may be stored.

The invention claimed is:

1. A system for detecting food related products before being thrown away, the system comprising:

one or more cameras;

a display unit;

a computing device that is communicatively connected to the one or more cameras and the display unit;

a scale that is communicatively connected to the computing device, wherein the scale is configured to hold a trash bin, wherein the one or more cameras are configured to obtain an image or a video of the food related products when the food related products are within a field of view of the one or more cameras and before the food related products are in the trash bin, wherein the scale is configured to obtain weight information of the food related products when the food related products are in the trash bin, and wherein the computing device is configured to:

receive the weight information from the scale and to obtain therefrom a weight of the food related products;

obtain information about the food related products from the obtained image or video by applying an image recognition algorithm configured to detect multiple ingredients in the image or the video and configured to assign to individual pixels of the image or video a respective ingredient label corresponding to one of the ingredients detected in the image or video, and by computing a ratio between the multiple ingredients detected in the image or video based on the ingredient labels assigned to the individual pixels;

assign weight estimates to the respective ingredients detected in the image or video by registering the weight across the multiple ingredients detected in the image or video pursuant to said ratio; and generate and output data on the display unit, wherein the data is based on the information about the food related products, on the weight estimates, and on the weight information.

2. The system according to claim 1, wherein the computing device is communicatively connected to a remote server, and wherein the computing device is configured to:

transmit the obtained image or video to the remote server for applying the image recognition algorithm; and receive the information about the food related products from the remote server.

3. The system according to claim 2, wherein the computing device is further configured to store one or more of the information about the food related products, the weight information, the output data, and at time stamp in a data storage of the remote server.

4. The system according to claim 1, wherein the computing device is configured to present one of more questions on the display unit about one or more objects in the obtained image or video in case the image recognition algorithm is unable to identify one or more of the food related products from the image or the video, and wherein the display unit comprises a user interface for receiving user input in response to the one or more questions, the response for use by the image recognition algorithm to improve detection of the one or more objects.

5. The system according to claim 1, wherein the one or more cameras are configured to automatically obtain the image or the video when the food related products are within the field of view at a substantially fixed position for a dynamic minimal amount of time necessary for successful detection.

6. The system according to claim 1, wherein the one or more cameras comprises a stereoscopic imaging camera for obtaining 3D volumetric information about the food related products from the image or the video, and wherein the computing device is further configured to improve the weight estimates assigned to the respective ingredients detected in the image or video based on the 3D volumetric information obtained by the stereoscopic imaging camera.

7. The system according to claim 6, wherein the image recognition algorithm is configured to obtain volumetric information from the 3D volumetric information, wherein the computing device is configured to obtain a weight estimation of the food related products based on the volumetric information, wherein the stereoscopic camera replaces the scale, and wherein the weight estimation is used instead of the weight information.

8. The system according to claim 1, wherein the one or more cameras comprises a hyperspectral imaging camera for obtaining substance information about the food related products from the image or the video.

9. The system according to claim 1, wherein the field of view is located in an area around a line of sight from the one or more cameras in a substantially downwards direction.

10. The system according to claim 9, further comprising a housing, wherein the housing comprises the display unit, wherein the housing accommodates the one or more cameras, wherein the housing comprises an outer surface side that is placed at an angle from a horizontal plane, and wherein the cameras are located within the housing at the outer surface side resulting in the line of sight being vertically angled at the angle, the line of sight being perpendicular to the outer surface side, wherein the angle is in a range of 15 to 45 degrees.

11. The system according to claim 10, wherein the housing further comprises the computing device.

12. The system according to claim 10, wherein the housing further comprises a visual indicator configured to indicate to the user a height at which the food related products are to be held with respect to the one or more cameras for obtaining the image or video before the user disposes the food related product in the trash bin.

13. The system according to claim 10, wherein the housing and the scale are connected by a vertically aligned support structure for fixing the housing at a vertical distance from the scale.

14. A housing comprising a display unit, the housing further comprising one or more cameras and a computing device, wherein the housing is configured for use in the system according to claim 10.

15. A method for detecting food related products before being thrown away, the method comprising:

obtaining an image or a video of the food related products using one or more cameras when the food related products are within a field of view of the one or more cameras and before the food related products are thrown in a trash bin;

obtaining weight information of the food related products using a scale when the food related products are in the trash bin, wherein the scale is configured to hold the trash bin;

receiving, at a computing device, the weight information from the scale and obtaining therefrom a weight of the food related products;

obtaining, by the computing device, information about the food related products from the obtained image or video by applying an image recognition algorithm configured to detect multiple ingredients in the image or the video and configured to assign to individual pixels of the image or video a respective ingredient label corresponding to one of the ingredients detected in the image or video, and by computing a ratio between the multiple ingredients detected in the image or video based on the ingredient labels assigned to the individual pixels;

assigning, by the computing device, weight estimates to the respective ingredients detected in the image or video by registering the weight across the multiple ingredients detected in the image or video pursuant to said ratio;

generating and outputting data by the computing device on the display unit, wherein the data is based on the information about the food related products, on the weight estimates, and on the weight information.

16. The method according to claim 15, further comprising:

transmitting the obtained image or video from the computing device to the remote server for applying the image recognition algorithm; and receiving the information about the food related products from the remote server in the computing device.

17. The method according to claim 15, further comprising: presenting one of more questions on the display unit about one or more objects in the obtained image or video in case the image recognition algorithm is unable to identify one or more of the food related products from the image or the video; and receiving user input from a user interface of the display unit in response to the one or more questions, the response for use by the image recognition algorithm to improve detection of the one or more objects.

\* \* \* \* \*